Nov. 25, 1969   P. C. DIMITRACOPOULOS   3,480,356
AUDIOVISUAL APPARATUS

Filed Feb. 10, 1967   4 Sheets-Sheet 1

United States Patent Office 3,480,356
Patented Nov. 25, 1969

3,480,356
AUDIOVISUAL APPARATUS
Panayotis C. Dimitracopoulos, Montreal, Quebec, Canada, assignor to The A.V. Corporation, N.V., Curacao, Netherlands Antilles, a corporation of the Netherlands Antilles
Filed Feb. 10, 1967, Ser. No. 615,140
Int. Cl. G03b 31/06
U.S. Cl. 353—19
7 Claims

ABSTRACT OF THE DISCLOSURE

An audiovisual apparatus for the simultaneous synchronized optical projection of an image and the reproduction of its associated sound from an audiovisual slide having a projectable transparency surrounded by a spiral sound track. The audiovisual apparatus accepts, beneath its optical projection axis, a compartmented magazine containing a series of such audiovisual slides from which they are individually pulled up, optically projected and reproduced, and then returned to the magazine, in a sequential and fully automated manner.

---

This invention pertains to audiovisual apparatus of novel construction and attributes, which project a visual image and simultaneously reproduce the sound accompanying such visual image. The visual image and its associated sound are both carried integrally on special audiovisual slides consisting of an optical transparency, such as a projection film or the like, carried directly upon, or forming a part of, a sound record, which is of the spiral sound track type, surrounding the optical transparency.

The invention comprehends apparatus of novel construction which facilitates the simultaneous optical projection of the visual image from such a slide or unit, and the aural reproduction of the accompanying sounds.

Photographic slides have become a popular and acceptable medium for the display of visual information, since they are relatively simple and inexpensive to prepare, both individually and as quantity reproductions, and can be projected to any desired enlargement with good definition and excellent color rendition. Their use in education, entertainment, industrial training, advertising and similar fields is commonplace. In the past, efforts to provide a system in which the projection of individual slides is accompanied by "synchronized" sound met with great difficulty, for reasons familiar to those working in this field. The usual prior approach had been the use of separate projectors and phonographs or tape reproducers, sometimes assembled in a single housing. Since separate media carried the picture and sound, automatic synchronization or complete integration of sound and picture was practically impossible.

In U.S. Patents No. 3,122,053, No. 3,122,054, No. 3,282,154, No. 3,302,520 and U.S. patent application No. 615,141, filed concurrently herewith in which the inventor of the present invention is the inventor or the co-inventor, novel audio visual apparatuses and audiovisual slides were described, which overcome the synchronization problem by permanently associating a recorded sound (audio) information with each visually-projectable image or visual slide, in such a way that a properly designed projector could simultaneously reproduce both the audio and visual records of each audiovisual slide unit, individually or sequentially, without any special requirements as to synchronization, the latter following inevitably from the fact of integration of the two kinds of records upon a single audiovisual slide unit.

In brief, the above-mentioned patents describe systems in which the individual audiovisual slides consist of an optical transparency, such as a projection positive film or the like, carried directly upon, or forming a part of, a sound record which is of the spiral track or groove type for ready reproduction by a special form of reproducer. In particular, the audiovisual slides are employed with an apparatus of special construction and attributes that permits the audiovisual slide units to be held stationary, while the reproducer for the sound track is rotated around the optical projection beam to achieve the necessary relative motion involved in sensing and reproducing the sound information. The satisfactory accomplishment of this combination yields important advantages for the system as a whole, among which are complete synchronization, ease of editing, elimination of requirements for expensive types of record units, the relaxation of manufacturing tolerances and requirements normally associated with other audiovisual systems of comparable or inferior performance characteristics, the ease and low cost of preparing record units of even the highest quality, and others.

The present invention pertains to apparatuses of the above type incorporating several improvements. In particular, while the sound reproducer rotates around the optical projection beam in the manner described in the above-noted patents, the slide-changing mechanism is improved, as is the method of lowering and lifting the rotating sound transducer on and away from the stationary audiovisual slide. These and other improvements, which will be described below, permit the construction of apparatuses which are more compatible to the audiovisual slides, permit a faster slide-change cycle, a better sound reproduction, are easier to manufacture, and are smaller in size and lighter in weight.

The invention will be described herein by reference to certain presently preferred specific embodiments thereof, with regard to the construction of the apparatus employed, however, it will be understood by those skilled in the art that the principles of the invention can be carried out by specifically different physical devices, both as to the nature of the information records and the projection equipment, and that in using words of limited meaning for the better understanding of the particulars of the forms chosen for description and illustration, it is not intended to exclude variations of those details which properly fall within the scope of the invention in its broader aspects.

The invention will now be described in some detail in connection with the specific chosen embodiments thereof, reference being made to the accompanying drawings, in which.

Figure 1:
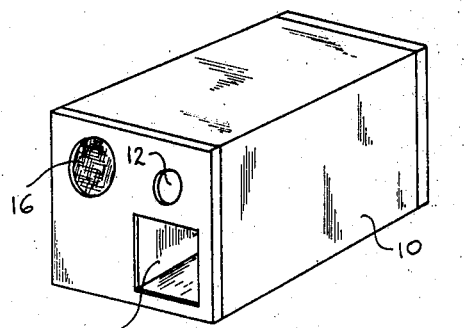
FIGURE 1 is a perspective view of one preferred form of the audiovisual projection apparatus of the invention.

FIGURE 1 illustrates in perspective view one very useful and adaptable format which the novel apparatus may take, including a main projector cabinet 10 of simple rectangular configuration whose front wall includes the usual light beam projecting aperture 12, behind which is the adjustable projection lens system for throwing an enlarged visual image from a slide unit onto a screen, wall surface, or the like. A loudspeaker 16 is disposed at one side of the lens opening, or may be elsewhere on the cabinet. A fore-and-aft magazine tunnel 20 is adapted to receive an audio-visual slide magazine 22 for indexed motion to present successive slides of a series of the proper position for vertical motion into projection (and record playing) position.

Figure 2:
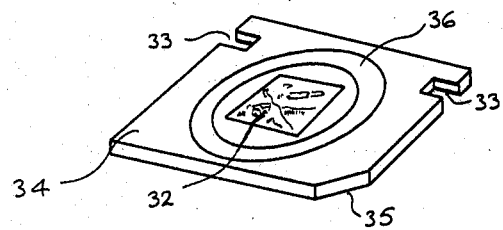
FIGURE 2 is a perspective view of a typical audiovisual slide for use in the system.
Figure 3:
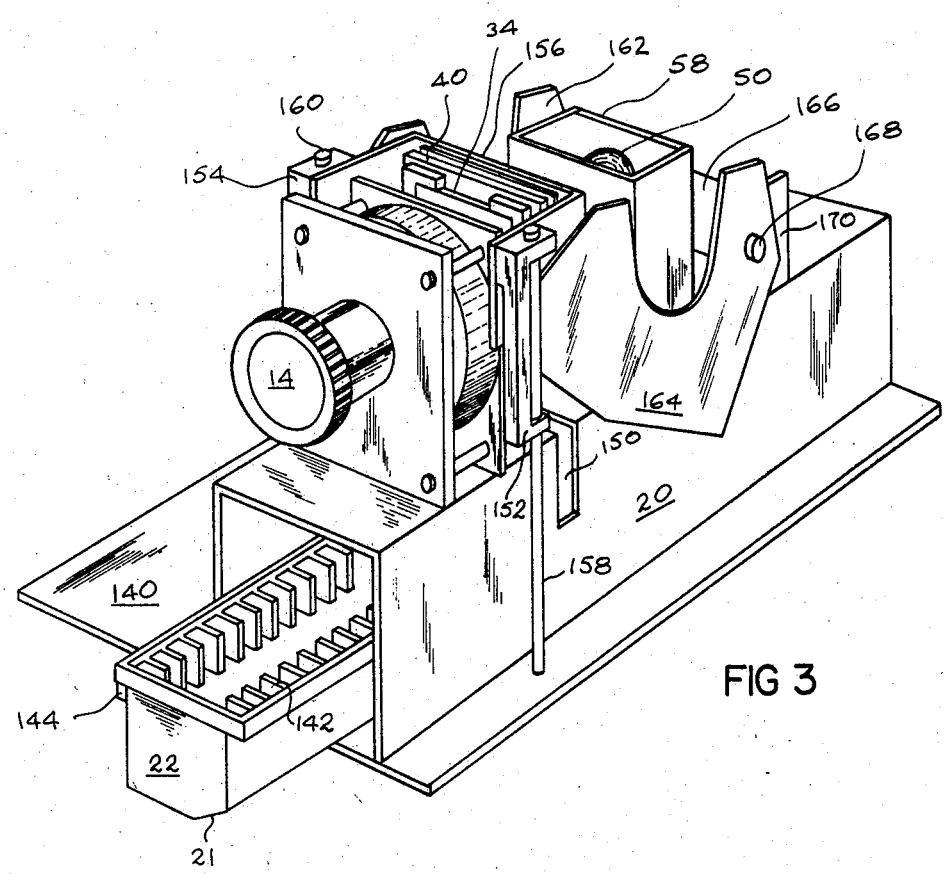
FIGURE 3 is a perspective view of the apparatus of FIG. 1, with its cabinet removed and its slide-magazine partly inserted in the magazine-tunnel.

As stated above, the audiovisual slide of the invention combines an optical (usually photographic) image record and a spiral sound record. A typical form of slide unit is shown in FIGURE 2, the projectable image being represented by a diapositive or film 32 mounted on a substantially rectangular support 34 including a sound track, here shown as a magnetic or phonographic track 36 arranged concentrically about the diapositive 32. A number of special features of this kind of record unit, and variations thereof have been described in the above-mentioned patents, in brief, the slide unit is held stationary in the optical path of the projector beam and its visual image is projected by the projection lens system, while the sound record of track 36 is reproduced by means of a rotating transducer or pickup of special form, also to be described.

The internal details and arrangement of the projector equipment will best be followed from a description of FIGS. 3 through 8 of the drawings. In the perspective view of FIG. 3, the cabinet 10 being removed, are shown usual components of a slide projector, including projection lamp 50 and chimney 58 on which is mounted the usual condensing lens 52 and mirror 54. An audiovisual slide 34 to be projected will be positioned on the slide support 40, in the optical axis, the imaging rays passing through a fixed cylindrical mount 66 whose forward part carries the focusable projection lens 14. The audiovisual slide is held stationary in projection position during reproduction of its sound track, this being permitted by the use of a special form of transducer mounting which rotates the sound pickup around the optical axis, as will be presently described referring to FIG. 4.

This figure shows an annular carriage member (or annular turntable) 72, journalled by bearing means (not shown) upon the fixed cylindrical mount 66, so that it may freely rotate about this mount 66 and thus around the optical projection axis. A small motor 73 carries on its shaft a rubber wheel 74, which contacts at its rim the annular turntable 72 and drives it at the desired speed. It is evident that other means may be also employed to drive the annular turntable 72, for example belts and the like.

Annular turntable 72 pivotally supports the pickup arm 76, so that it may freely swing about the two shafts 78 and 80, in planes at right angles to one another, in the usual fashion, but arm 76 is also nicely balanced, as by a counterweight 82, so as not to be influenced by gravity, or the rotation of the annular turntable 72. Another counterweight 84, which is mounted on the annular turntable 72, substantially diametrically opposite the shaft 80, fully counterbalances the weight of the arm assembly, and this arrangement ensures the necessary smooth and uniform rotational motion of the turntable 72.

The free end of arm 76 carries the pickup cartridge 88, which may be a phonographic, magnetic, or other type transducer, depending on the sound track on the audiovisual slide, which transducer can thus approach or recede from the spiral record track of the audiovisual slide 34, when the latter has been propelled from the magazine 22 into playing position confronting the turntable 72, as will be explained in detail below.

The fixed cylindrical mount 66, above described, is supported on a support plate 67, which in turn is permanently mounted on the magazine tunnel 20. A control plate 110, having substantially at its center a circular opening, exposing the central part of annular turntable 72, and thus also pickup arm 76, is supported on support plate 67 by means of four headed posts 113. These posts pass within the coil springs 112 and through clearance holes in the control plate 110, so that the four coil springs 112 urge the control plate 110 against the heads of the headed posts 113.

Secured on pickup arm 76 is a lever or bent stem 77, whose tip 79 faces and is at a small distance away from the rear surface of the control plate 110, and therefore, as long as the control plate 110 is at its rest position, the pickup arm is free to move and follow the sound track on the audiovisual slide. However, when the control plate 110 is pushed against the force of the coil springs 112, it moves in the direction of the arrows A, and makes contact with the tip 79 and thus lifts the pickup arm away from the surface of the audiovisual slide. Furthermore, if the turntable keeps rotating, the component of friction force (known as "skating force") will force the tip 79 (and therefore the pickup arm) towards the center of rotation, and thus will reposition the sound transducer in preparation of the following reproduction cycle. The above is useful when the spiral of the sound-track on the audiovisual slide follows an "inside-out" path. If an "outside-in" path is employed, the sound transducer on the pickup arm must move away from the axis of rotation, in preparation of the next reproduction cycle. This may be accomplished by the proper positioning of the tip 79 in relation to the pickup arm axis 78, by the use of intervening levers, by pressing or forming appropriate "lead" grooves on the surface of the control plate 110 facing the tip 79, or simply by giving a conical shape to the surface of the control plate 110, so that the tip 79 (and thus the pickup arm) moves away from the axis of rotation, provided, of course, that the annular turntable 72 keeps rotating.

Figure 4:
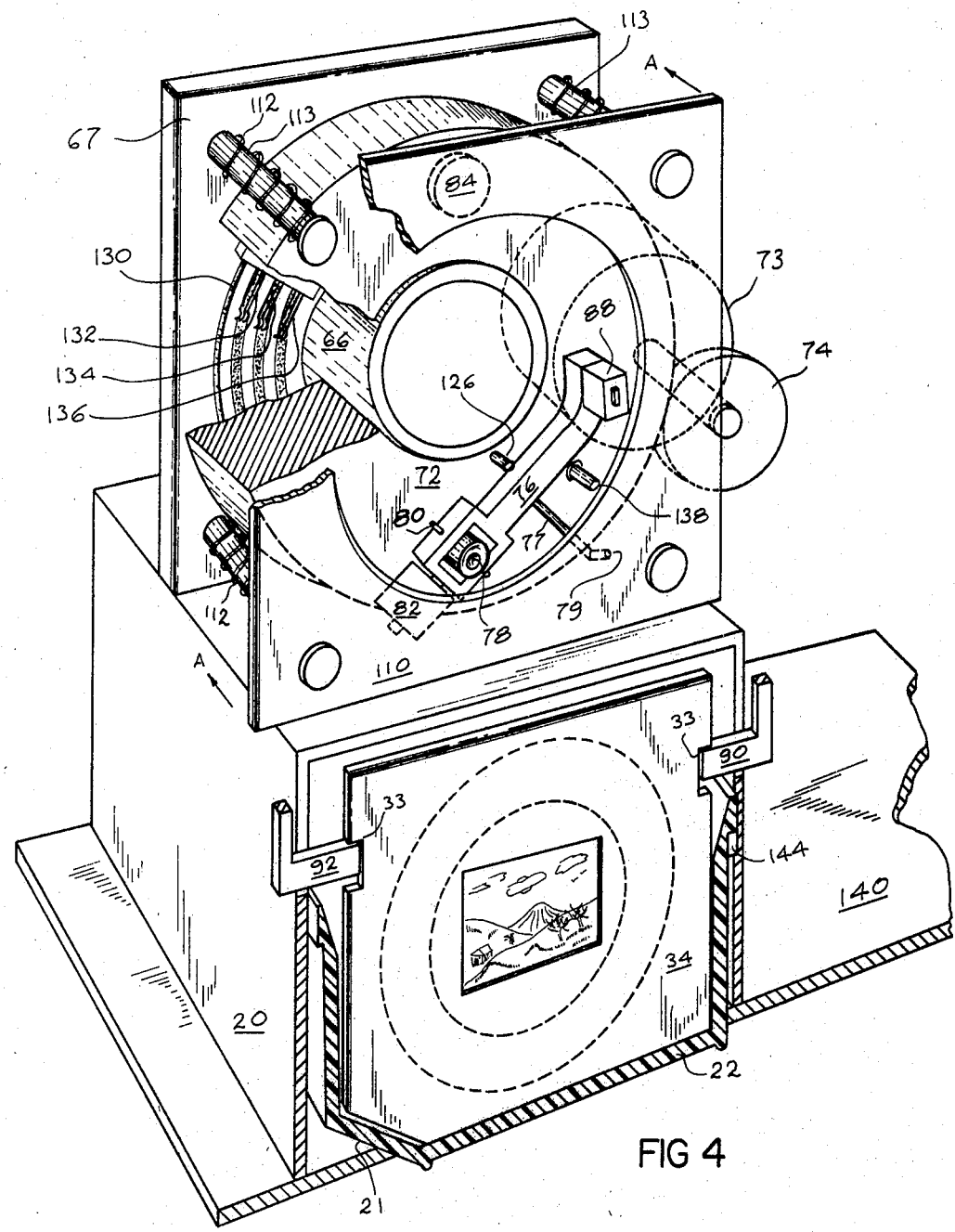
FIGURE 4 is a perspective view, to a larger scale and with parts broken away, of the essential features of the sound reproducing portions of this equipment, together with a broken perspective view of the magazine for holding and feeding audiovisual slides.
Figure 6:
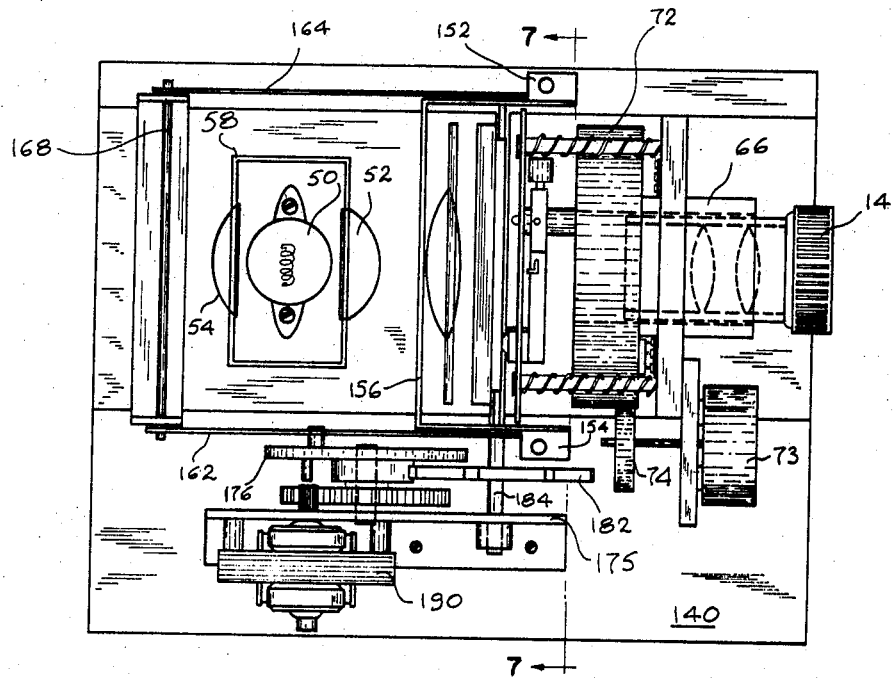
FIGURE 6 is a plan view of the apparatus of FIGURE 3.

It is necessary to provide an electrical connection to the rotatable pickup device, so that its signals can be conveyed to an amplifier and reproducing device such as the loudspeaker 16. A convenient, simple and very effective arrangement is illustrated in FIG. 4, in which there is fixedly mounted about cylindrical support or mount 66 an insulated plate 130 carrying concentric (for example, "printed") slip ring patterns cooperating conductively with respective springy contact brushes (for example 132, 134 and 136), affixed to the rear side of the annular turntable 72, as by an insulated support bar. Two of the brushes may be connected by flexible leads (not shown) to the pickup transducer 88 in the known way, while the third brush may be connected to a contact stud 138 mounted on annular turntable 72 by an insulating bushing (if 72 is conductive). This stud also acts as a limit stop for the pickup arm 76 in the direction opposite to stop pin 126, and when the stylus reaches the lead-out groove of an audiovisual slide, contact of pickup arm 76 with contact stud 138 at least momentarily connects the third slip ring to a common electrical return path. Thus the two outermost brushes 132 and 134 may be the signal path conductors from the pickup cartridge to the amplifier, while brush 136 may be connected to contact stud 138. Then brush 134 becomes the common electrical return path, and together with brush 136 forms part of the control circuit for the cycling signal or impulse.

It is evident that the sound transducer 88 may require more than two leads (for example if a record-playback-erase magnetic transducer is employed, or a stereo phonographic cartridge), or more than one signal or command signals may be required. (In such a case an appropriate number of slip-rings and brushes will be used.)

The above-mentioned optical and sound reproducing members are mounted on an inverted U-shaped member, secured on base-plate 140, thus defining the fore-and-aft magazine tunnel 20, which is adapted to receive the audiovisual slide magazine 22. Magazine 22 is of the conventional slide-magazine type, i.e., it constitutes a sort of compartmented record box formed with a plurality of parallel ribs 142 separated and holding in place the individual audiovisual slides. The magazine is open at the side facing towards the projector axis, and is provided with the usual rack-teeth 144 to cooperate with a magazine-indexing pinion 180 mounted in the vertical wall of the magazine tunnel 20, and connected for rotation by the magazine-advancing mechanism.

Proceding now with the description of the magazine operation and its automatic advance motion through the tunnel 20, reference is made to FIGS. 4, 6, 7, and 8, each of which omits some parts for clarity. It is noted (see FIG. 2) that the audiovisual slides have corners 35 (the lower right corner in the illustration) missing, corresponding with raised (sloping) bottom wall 21 of magazine 22. These configurations assure that the audiovisual slides may only be inserted in the magazine in the proper orientation, i.e. with the sound record facing the rotating annular turntable 72.

The lifting of the audiovisual slides from their nesting position in the magazine, to the slide support 40, i.e. in the proper position for projection and sound reproduction, is accomplished by means of two "lifting fingers" 90 and 92 (see FIGS. 4 and 7), the tips of which engage inside appropriate cut-outs or notches 33 on each audiovisual slide. In order to allow an audiovisual slide to be lifted in the "playing" position, the magazine tunnel 20 has an appropriate slot 150 (see FIG. 5), on its upper or top surface, which also partly extends to its sides, so that the "lifting fingers" 90 and 92 may reach the notches 33 of the slides nesting in the magazine 22.

The lifting fingers 90 and 92 are mounted, or form part of a U-shaped member 156 (see FIG. 3), which in turn is mounted on two sliding members 152 and 154, formed with bearing means permitting them to slide along (up and down) shafts 158 and 160. These shafts 158 and 160 are permanently secured to the base plate 140 and the top plate 141 (see FIG. 7) of the apparatus. It is thus evident that the slide-lifting assembly formed by the combination of members 90–92, 156 and 152–154 is free to slide, as one single unit, up and down, along shafts 158 and 160, to lift individual audiovisual slides away from the magazine into the proper position for projection and reproduction, and lower them back into the magazine, as, and when desired.

The above-described slide-lifting assembly may be manually activated up-and-down, or may be preferably motor-driven. Motive power may be provided in various ways, and one will be described here, as an illustration, reference being made to FIGURES 3 and 8. Two panels 162 and 164 are permanently connected to one another by means of bracket 166 and are hingedly attached, by means of shaft 168, to support bracket 170, which is permanently secured to the top of magazine tunnel 20.

Panel 162 (see FIG. 8) has an elongated opening or hole 172, of appropriate size and shape, and pin 174, secured to wheel 176, passes inside this hole. As wheel 176 rotates about its shaft 178, pin 174 moves in a circular path about shaft 178, and thereby forces the panel 162 up and down about its hinge 168. For example, as pin moves from position 174′ to 174, it pushes panel 162 up. Upon reaching its uppermost position 174, pin commences to decend, and forces panel down. Thus, as pin 174 moves in a circular path, it engages hole 172, and forces panel 162 (and with it, its connected panel 164) to move up and down, about its hinge 168. The tips of panels 162 and 164 are hingedly connected to the slide lifting assembly (members 90–92, and 156 and 152–154, above-described) and therefore force it up-and-down along shafts 158 and 160, thus lifting and lowering individual audiovisual slides away from, and back into, magazine 22.

Once an audiovisual slide has returned to the magazine 22, it is necessary to advance it in order to expose the following slide to the "lifting fingers" 90 and 92. This may easily be accomplished in several ways, and again for illustrative purposes one will presently be described. It has already been mentioned that the side of the magazine 22 carries a lengthwise rack 144. When positioned in the tunnel 20, and sufficiently advanced, the rack engages the teeth of pinion 180, which together with Geneva-gear 182 is secured to shaft 184 journalled on the face of tunnel 20 and an appropriate bracket 175 (see FIG. 6). Concentrically fastened to wheel 176 is the usual Geneva driver-roller 185 (and its associated cam 186), which engages and drives intermittently the Geneva-gear 182, in the known fashion.

After the pin has reached position 174″ and therefore the panel 162 its lowermost position (and thereby the audiovisual slide has been returned to the magazine) the pin continues to move from position 174″ to 174′ (i.e. within the circular portion of the slot 172, thus not moving panel 162), the Geneva motion turns pinion 180 by one tooth, the pinion in turn moves the magazine one position, and thus exposes the following audiovisual slide to the lifting fingers 90 and 92. The assembly of wheel 176, pin 174, and Geneva cam 186 and roller 185 are firmly secured to shaft 178 and through the proper gears (see FIG. 6) are driven by motor 190.

Figure 5:
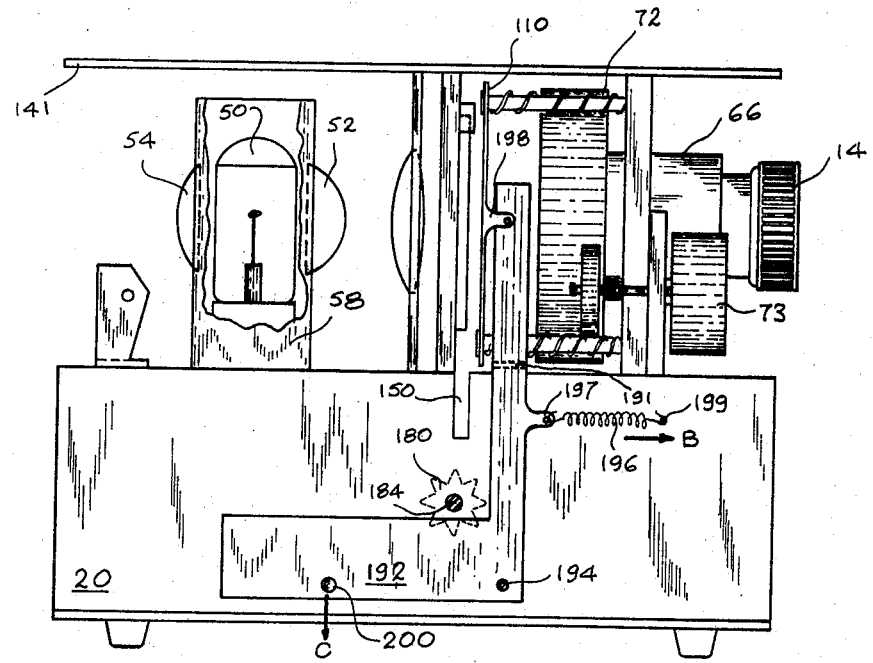
FIGURE 5 is a vertical view of the apparatus illustrated in FIGURE 3, with some parts removed for clarity.
Figure 7:
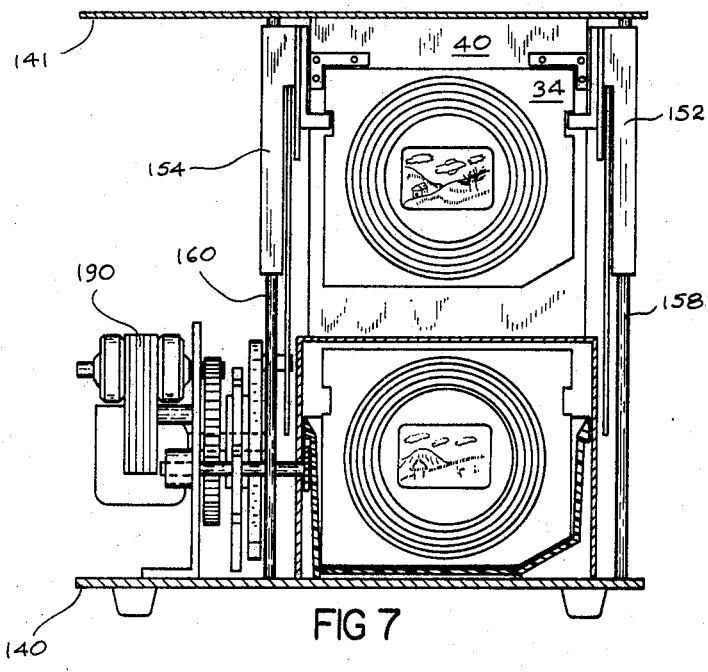
FIGURE 7 is a vertical sectional view taken along line 7—7 of FIG. 6, with parts removed for clarity.
Figure 8:
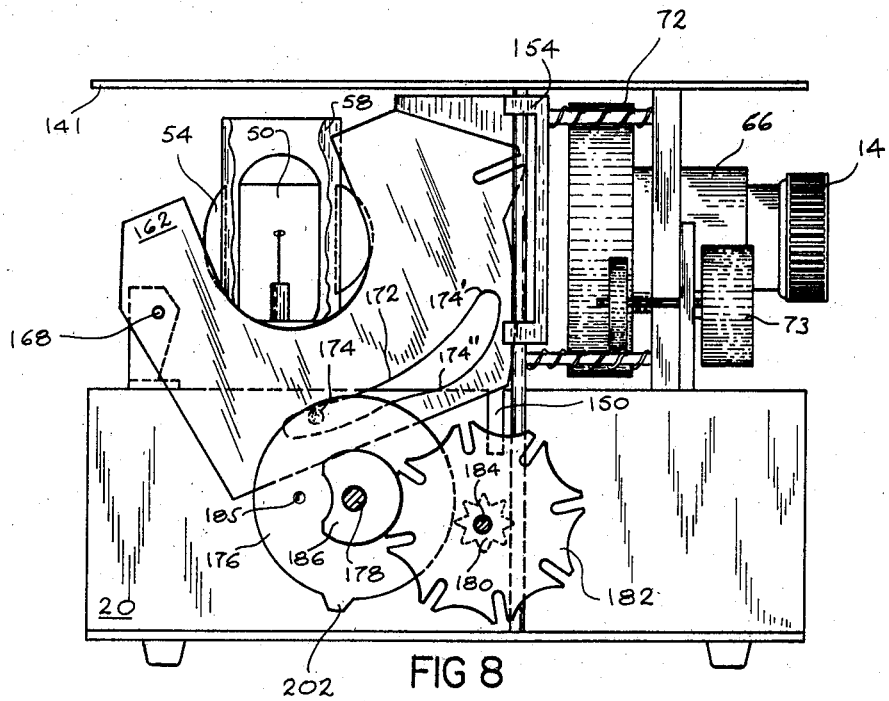
FIGURE 8 is again a vertical view, similar to FIG. 5, illustrating some parts not shown in that figure, but omitting others for clarity.

While the audiovisual slides are moving into and away from their "playing" position on slide support 40, it is necessary that the pickup arm 76 be retracted. This may be accomplished in the following way:

An assembly of two L-shaped members, connected by bracket 191 (see FIG. 5), straddles tunnel 20, so that one L-shaped member lies on each side of the tunnel, and is hingedly attached to it by means of two pivot studs, one of which, 194, is shown in FIG. 5, while the other, lying on the other side of the tunnel is obscured by it. The front, L-shaped member is designated by numeral 192, while the second is again obscured by 192.

L-shaped member 192 is attached to control plate 110 at 198 and the second L-shaped member is similarly attached to the control plate 110 at the other end. A spring 196, attached to the L-shaped member at 197 and to the tunnel at 199, urges the L-shaped member assembly, and thereby the control plate 110, in the direction of arrow B, thus lifting the pickup arm 76. The L-shaped member 192 has a pin at 200 and the wheel 176 a cam 202 (see FIG. 8) in such a position relative to pin 174, that when pin 174 has lifted the penel 162 (and therefore an audiovisual slide at its "playing" position), the cam 202 urges the pin 200 in the direction of arrow C (FIG. 5), against the force of spring 196, and thereby releases control plate 110, which in turn releases the pickup arm, allowing it to be lowered and freely follow the sound track on the audiovisual slide.

Automatic cycling of the magazine, and the associated functions, can readily be provided by providing position-operated switches (not shown for clarity) for engagement with cams on wheel 176, with the upper edge of the slide when in "playing" position on support 40, or elsewhere. Remote control, by cabled wiring, or other system, is also simple to provide.

Having described the various elements and members of this preferred form of apparatus, it will be helpful to describe a full cycle of operation. The individual audiovisual slides are inserted in the magazine 22, which is placed inside tunnel 20 and advanced until rack 144 engages pinion 180. Upon switching the automatic cycling, motor 190 rotates wheel 176 which, by means of its pin 174, lifts slotted panel 162. Slotted-panel assembly 162–164 lifts slide-lifting assembly 90–92, 156, 152–154, and "lifting fingers" 90 and 92 lift an audiovisual slide away from the magazine and into the "playing" position on the slide support 40. At this point cam 202 on wheel 176 pushes pin 200, and thereby L-shaped member, releasing control plate 110, which in turn lowers the pickup arm on the starting spiral of the sound groove of the audiovisual slide.

Proper position-operated switching interrupts motor 190. Turntable 72 rotates pickup arm 76 with its associated transducer 88, and sound is reproduced in loudspeaker (or sound is recorded on the audiovisual slide, if it is a recording operation). Upon reaching the end of the sound track, pickup arm contacts stud (or contact) 138 momentarily, thereby sending the command signal that starts the motor 190, turning wheel 176, whose cam 202 disengages pin 200. Control plate 110 retracts pickup arm 76 (away from the surface of the audiovisual slide) and repositions it in preparation of the following sound recording or reproducing cycle, following which, the panel assembly 162–164 is lowered, lowering the audiovisual slide into the magazine. After the slide has fully nested into the magazine, the Geneva-driver-wheel-and-roller engages the Geneva gear, which in turn, rotates the pinion 180, thereby advancing the magazine by one position, thereupon the above-described cycle repeats itself.

As previously mentioned, the sound track on the audiovisual slides may be phonographic, magnetic, photographic, etc., and the sound transducer on the pickup arm may accordingly be phonographic, magnetic, photographic etc.

While specific embodiments of the invention have been disclosed herein, it will be understood that various modifications and variations, within the spirit of the invention, may occur to those skilled in the art.

What is claimed is:

1. Combined sound and picture projecting apparatus for use with audiovisual slides having a projectable transparency surrounded by a spiral sound track disposed thereon, comprising: optical picture projecting means including a slide support for locating one of said audiovisual slides with its transparency in a substantially centered position relative to the optical projection axis thereof, a rotatable sound transducer carrier mounted for rotation about the central axis of the sound track, a sound transducer mounted on said carrier for radial movement in one radial sense relative to the central axis of the sound track during the scanning thereof, means for biasing said transducer towards the sound track of said slide located on said support, and means for withdrawing said transducer from the sound track against the force of said biasing means and for concomitantly moving said transducer relative to said central axis in the opposite radial sense in preparation for a succeeding sound operation, the above-mentioned means, parts and components being mounted over a tunnel whose lengthwise axis is substantially parallel to said optical axis and having a substantially rectangular cross-section, a substantially narrow opening in the top wall of said tunnel, which opening extends partly into each side wall of said tunnel, said tunnel being adapted to slidably contain a magazine supporting a plurality of said audiovisual slides, indexing means for indexing the magazine stepwise to align the slides therein, one at a time, in succession, with said opening in the top wall of said tunnel, and lifting means, having a reciprocating motion, engageable with the audiovisual slides for pulling them up, one at a time, along a plane substantially parallel to said slide support, through said opening into the working position on said slide support and thereafter lowering them back into the magazine, said lifting means comprising two lifting fingers, one on each side of said tunnel projecting, during a part of the reciprocating motion, through the portion of said opening in each side wall of the tunnel and into engagement with corresponding notches on the sides of the audiovisual slides, said lifting fingers being disposed on a member which is slidably supported for reciprocating motion along a plane parallel to said slide support and therefore perpendicular to said lengthwise axis of the tunnel.

2. Apparatus according to claim 1 above, wherein said lifting means and indexing means are motor-actuated through gear means, in such a fashion that said indexing means moves the magazine, one step at a time, only after said lifting means have returned to a position corresponding to the position they assume when they have lowered an audiovisual slide into the magazine.

3. Apparatus according to claim 2 above, wherein one of the components of said gear means carries pin means engageable into camming means actuating said reciprocating motion of said lifting means.

4. Apparatus according to claim 2 above, wherein one of the components of said gear means actuates a Geneva movement which rotates, one tooth at a time, a pinion gear engageable with a rack running lengthwise of, and forming part of the magazine, and therefore moving the magazine in a step-wise motion.

5. Apparatus according to claim 2 above, wherein one of the components of said gear means carries camming means to trigger and control actuator means for moving said sound transducer into and out of operative positions relative to the sound track, and to control the motion of said lifting means and indexing means at the desired intervals of the operating cycle.

6. Apparatus according to claim 2 including electrical contact and switching means responsive to the termination of the sound operation, and also responsive to the operator's control, for initiating the motion of gear means.

7. Combined sound and picture-projecting apparatus for use with audiovisual slides having a projectable transparency surrounded by a spiral sound track disposed thereon, comprising: optical picture projecting means including a slide support for locating one of said audiovisual slides with its transparency in a substantially centered position relative to the optical projection axis thereof, a rotatable sound transducer carrier mounted for rotation about the central axis of the sound track, a sound transducer mounted on said carrier for radial movement in one radial sense relative to the central axis of the sound track during the scanning thereof, means for biasing said transducer towards the sound track of said slide located on said support, and means for withdrawing said transducer from the sound track against the force of said biasing means and for concomitantly moving said transducer relative to said central axis in the opposite radial sense in preparation for a succeeding sound operation, said withdrawing means comprising a reciprocable control plate positioned between said slide support and said rotatable carrier, movable toward and away from said rotatable carrier and always substantially parallel to the plane of rotation of said carrier and having a large hole substantially in registry with the axis of rotation of said carrier and of sufficient size to expose said carrier and said sound transducer, and therefore not interfering with the sound scanning operations of said transducer, which freely passes through said hole, said control plate being engageable with said transducer to withdraw said transducer away from the surface of the sound track in preparation for the succeeding sound cycle without interference with the rotation of said carrier.

(References on following page)

References Cited

UNITED STATES PATENTS

| | | | |
|---|---|---|---|
| 2,460,359 | 2/1949 | Page | 353—118 |
| 2,579,281 | 12/1951 | Tuck | 353—118 |
| 3,348,450 | 10/1967 | Zillmer | 353—118 |
| 2,579,281 | 12/1951 | Tuck. | |
| 2,898,807 | 8/1959 | Ewald. | |
| 3,122,054 | 2/1964 | Dimitracopoulos et al. | |
| 3,138,062 | 6/1964 | Maieshofer. | |
| 3,208,340 | 9/1965 | Rom et al. | |
| 3,240,117 | 3/1966 | Wickstrom et al. | |
| 3,389,636 | 6/1968 | Weitzner et al. | |

NORTON ANSHER, Primary Examiner

R. M. SHEER, Assistant Examiner

U.S. Cl. X.R.

353—115, 116, 118, 120